Patented Feb. 23, 1932

1,846,127

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

ORTHO CHLORO PARA CRESOL CARBOXYLIC ACID

No Drawing. Application filed May 22, 1930, Serial No. 454,825, and in Germany May 28, 1929.

Our present invention relates to ortho-chloro-para-cresol-carboxylic acid and to a process of making same.

This process consists in heating with carbonic acid under pressure in alkali metal salt of 1-methyl-2-chloro-4-hydroxy-benzene.

This phenol has several positions unoccupied and therefore several isomer carboxylic acids were to be expected. Nevertheless the uniform formation of single carboxylic acid has been proved.

Since this carboxylic acid exhibits an intense violettish coloration when mixed with ferric chloride, the carboxylic group is proved to have entered into an ortho-position relating to the hydroxy-group. It corresponds probably to the formula:

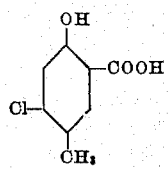

This acid is a valuable intermediate product for the production of dyestuffs.

In order to further illustrate our invention the following example is given, the parts being by weight and all temperatures in centigrade degrees, but it is however to be understood, that our invention is not limited to the particular reacting conditions mentioned therein.

Example 1425 parts of 1-methyl-2-chloro-4-hydroxy-benzene are dissolved in 416 parts of caustic soda of 96% and 3000 parts of water in an autoclave provided with a stirrer and the water is distilled off, finally in vacuo, until the mass becomes entirely dry. Into the cold reaction mass carbonic acid is introduced until a pressure of 10 atmospheres and the whole is heated to 150° for 10 hours. The cold mass is dissolved in hot water. From the filtered solution the 1-methyl-2-chloro-4-hydroxy-benzene-5-carboxylic acid is precipitated by means of hydrochloric acid. For further purification it is dissolved in sodium acetate or carbonate solution and again precipitated therefrom with an acid. When recrystallized from dilute alcohol it melts at 210–212°. The alcoholic solution of this acid yields a violet coloration after the addition of a dilute solution of ferric chloride.

By starting with the potassium salt of ortho-chloro-para-cresol the process may likewise be carried out.

We claim:

As a new compound the ortho-chloro-para-cresol-carboxylic acid of the formula:

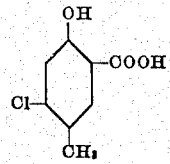

which compound melts when recrystallized from dilute alcohol at 210–212° and yields when dissolved in alcohol a violet coloration after the addition of a dilute solution of ferric chloride.

In testimony whereof, we affix our signatures.

LEOPOLD LASKA.
OSKAR HALLER.